Feb. 19, 1952     H. A. TOULMIN, JR     2,586,275
PROCESS OF MAKING LAYERED SPONGE PRODUCTS OF VARYING DENSITIES
Filed Sept. 10, 1949
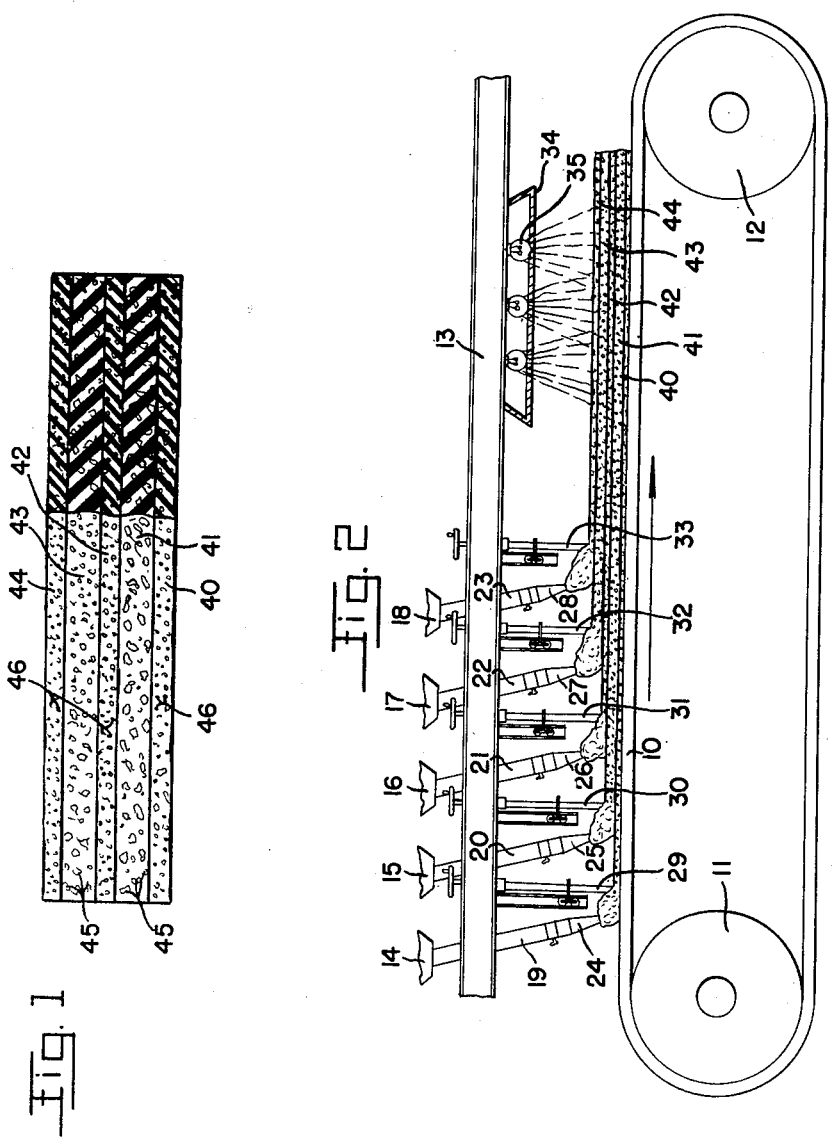
INVENTOR
HARRY A. TOULMIN, JR.
By Toulmin & Toulmin
ATTORNEYS Patented Feb. 19, 1952

2,586,275

UNITED STATES PATENT OFFICE 2,586,275

PROCESS OF MAKING LAYERED SPONGE PRODUCTS OF VARYING DENSITIES

Harry A. Toulmin, Jr., Dayton, Ohio, assignor to The Commonwealth Engineering Company of Ohio, Dayton, Ohio, a corporation of Ohio Application September 10, 1949, Serial No. 115,034

9 Claims. (Cl. 18—53)

This invention relates to the processing of rubber. More particularly it relates to the process for the forming of foam rubber and products thereof. Still more particularly it relates to rubber products having strata of uniform cellular structure laminated with strata of differing density.

Sponge rubber has generally been prepared by introducing gaseous material into dispersions of latex, or by incorporating substances capable of developing gases when subjected to heat.

The curing treatment for these rubber sponges has been dependent upon the compounding ingredients incorporated into the rubber dispersion. It varies from freezing the foam, acidifying to coagulate the frozen foam, and then vulcanizing to the treatment, such as heat coagulating and vulcanizing in a mold.

The nature of these processes eliminates the possibility of forming multi-layered products, whose layers are of varying density except as a multi-step process involving the deposition and partial or total curing of a single layer and repeating the deposition and curing steps until the desired number of layers have been deposited.

It is an object of the present invention to overcome the disadvantages and limitations of the processes known heretofore.

It is another object of the present invention to provide a process which is readily adaptable to continuous operation.

It is a further object of this invention to provide a process which continuously deposits a foam rubber consisting of a number of foam rubber layers of varying density.

It is still another object of this invention to provide a method of making sponge rubber of varying density foam layers without the use of closed molds.

It is another object of the present invention to provide a method wherein foam is deposited continuously for curing and the layers of foam superimposed upon one another are of such stability that there is no appreciable merging of the layers except at the interface.

It is still another object of this invention to provide a method of making multiple-layers sponge rubber from latex foams wherein foaming is effected at the time of depositing for curing.

It is a further object of the present invention to provide a unitary foam product of marked resiliency having improved stability.

It is also an object of this invention to provide a produce which is useful as a mat in its own right as well as a back for fabrics, carpets, paper, leather, and the like.

It is another object of the present invention to provide a product having the more attenuated structure protected against rupture by rough usage through the medium of adjacent sponge rubber layers of higher density and therefore greater resistance to scuffing and wear.

Other and more specific objects and advantages will be apparent to one skilled in the art as the following description proceeds.

The processing steps involved in the continuous manufacture of the multi-layered sponge rubber of the instant invention comprises the compounding of latex dispersions of natural or synthetic rubber to produce foams of predetermined density and rapid coagulation characteristics, depositing the sponge rubber continuously in superimposed layers, adjacent layers of which are of different densities, and curing the superimposed layers of foams into an intimately bonded unitary mass.

The foams useful in this invention may be prepared in a number of ways and adjacent layers of sponge material need not be foamed in the same manner or by means of the same agents. In addition, the foams need not be prepared from the same type of rubber dispersion.

Natural, as well as synthetic, rubbers or their mixtures are applicable for this invention. Thus, the term dispersion is to be understood to mean any dispersion of a rubber and rubber-like substances, including synthetic, reclaim, partially prevulcanized, and natural rubbers in a colloidal suspension form.

Neoprene, butadiene, polymers, as for example, butadiene-styrene, butadiene acrylonitrile polymers, polyvinyl chloride, and other equivalent latices have been found especially satisfactory.

It is essential to the instant invention that the foams quickly attain such stability that they may be cured, for example, while standing in air and not have appreciable mixing of the layers.

The layers of foam when deposited, when of proper consistency, will form merely an interlocking or mixing of the rubber mixture along the interface between the two deposited layers.

One method of obtaining stability in the foams is the use of delayed coagulants. These delayed action gelling agents are, for example, polyvinyl methyl ether, sodium silico fluoride, ammonium sulfate, and equivalent salts of weak base and strong acid.

The dispersions may be compounded with stabilizers, the above mentioned gelling agents, activators or accelerators, latex thickeners, and the like.

Following compounding the dispersion may be foamed by any number of methods, such as the incorporation of gases under pressure, such as carbon dioxide, nitrous oxide, propane, and equivalent gases, or by generation of gas by the reaction of, for example, an enzyme with hydrogen peroxide or by the action of heat on sodium bicarbonate or other equivalent reactions.

The density of each layer of sponge is determined by the quantities of reactants added to each dispersion or the amounts of gas incorporated therein. For example, 1 to 20% by weight of peroxide and .5 to 2% by weight of the dispersion of commercial yeast which supplies the reacting enzyme have proven satisfactory.

A wide variation in solubility of gases and the pressures under which the gases are used makes generalizations concerning gases have little meaning. However, with gases such as nitrous oxide, charging has been carried out under pressures ranging from 25 to 500 pounds per square inch.

Under the influence of the above types of foaming constituents, dispersions of rubber have been expanded to have a wide range of densities ranging from 0.1, which is a highly expanded foam, to .8 or .9, which is a relatively dense foam.

It will at once be recognized that the rubbery material surrounding each gas pocket will be in a highly attenuated state and imparts soft yielding characteristics.

A gelling agent, such as sodium silico fluoride, is used in quantities ranging from .5 to 5% by weight of dry solids in the dispersions, with the preferred amount being about 1%.

By adjustment of the pH of the dispersion, gelation may be caused to occur over a period of from 30 seconds to 30 minutes. In general, for the purposes of this invention, it is preferred that the expanded foams gel in a period ranging from 3 to 7 minutes.

If it is preferred that the dispersions be at a pH approximately neutral at the time of foaming, stabilizers may be added to prevent coagulation before the dispersion is foamed.

Compounds such as polyethylene glycol oleyl ether may be added in quantities ranging from approximately ½ part per 100 parts of dispersion to 5 parts per 100 parts.

The amount is determined not only by the pH of the latex composition, but also the type of gelling agent, total solids content, and like variables.

Inasmuch as the foams are to be vulcanized, numerous agents may be intimately mixed into the dispersion, preferably activators or accelerators for the curing operation such as zinc diethyl dithio carbamate, zinc salt of 2 mercaptobenzothiazole, and equivalent polyvalent metal products.

Another agent in common use is zinc oxide. Zinc oxide is a curing activator.

The action of the above described reagents is in no way hampered by addition of foam stability agents, as for example, the soaps.

Latex thickeners may also be employed for increasing the foam stability. An example of a latex thickener is a 5% solution of methyl cellulose.

The temperature of vulcanization depends upon the type of rubber, its accelerators, and so forth. The time for vulcanization likewise varies.

The problem involved in its solution is well known in the rubber industry and needs no description here, except that an oven temperature of from 200 to 250° F. has been found satisfactory.

The length of time for heat treatment varies greatly, depending upon such factors as thickness of the foam and the like.

The invention will be more fully understood from the following description taken in connection with the accompanying drawing in which:

Figure 1 is an enlarged elevational view partly in section of a foam rubber mat; and Figure 2 is a side elevational view partly in section of the apparatus for laying down the mat of Figure 1.

Referring to Figure 2, the apparatus consists of an endless belt 10 which may be suitably greased, graphited, coated with talc, or otherwise insulated to prevent adherence of rubber foam thereto.

Belt 10 is supported by suitable means 11 and 12 such as drums or sprockets. Positioned adjacent to and above the belt is a framework 13.

Framework 13 is a portion of the total framework which supports the mixing units 14 to 18, inclusive, such as tanks or autoclaves. The tanks 14 to 18, inclusive, are provided with outlet conduits 19 to 23, inclusive, each adapted with an adjustable nozzle 24 to 28, inclusive.

Tanks 14 to 18, inclusive, are each adapted for thorough mixing of material within the tanks by well known mixing means, which it is believed unnecessary to show here.

Framework 13 also supports a series of vertically adjustable doctor blades 29 to 33, inclusive. In addition, framework 13 also supports heating unit 34 directly over the belt 10. In this instance unit 34 is illustrated as a battery of infra red lamps 35.

In operation of the equipment, a latex dispersion is compounded in each of the tanks 14 to 18. When the mixtures are in condition for depositing on the belt, the nozzles are opened and the depth of foam adjusted by the doctor blades 29 to 33, inclusive. In this way layers of foam 40 to 44, inclusive, are deposited.

The foams gel as a result of the action, for example, of a delayed action gelling agent, such as sodium silico fluoride, and are timed to come to the curing station at approximately the time of completion of foaming.

During this time the rubbery material at the interface of the various layers interlocks and mixes to a limited extent.

As illustrated the five layer mat is then cured by the heat rays which produce a temperature in the range of 225 to 300° F. This mat, as illustrated in Figure 1, is honeycombed with small gas pockets 45 in layers 41 and 43. The size of the gas pockets 46 in layers 40, 42 and 44 are illustrated as smaller, thus giving a more dense material.

While it is to be understood that other combinations are possible, the illustration is given with reference to a five layer mat having two layers of low density synthetic foam sandwiched between three layers of higher density natural rubber foam.

By the use of this combination, hard wearing surfaces are exposed to scuffing while the layers of lower density, for delicate synthetic foam are enclosed and protected.

On the other hand, there are many uses for which a soft exterior is needed, as for example, in automobile seats wherein there is need for reenforcing dense layers of foam adjacent the spring construction. Thus, all various combinations are comprehended as being within the scope of this invention.

Foams for use in the apparatus as described may be prepared as follows:

In the three tanks 14, 16 and 18, a natural rubber dispersion may be compounded as follows:

Natural creamed latex (67.4% solids)
(10.3) _____ parts__ 100.0
25% polyethylene glycol ether solution
(10.3) _____ parts__ 1.2

To this dispersion may be added sufficient 2 normal sulfuric acid to adjust the pH to approximately 7.

There may then be mixed into the substantially neutral latex dispersion, etc., 2 parts of 25% polyvinyl methyl ether (7.7).

To this dispersion may be added as compounding material a vulcanizing dispersion composed of:

| | Parts |
|---|---|
| Zinc oxide | 3.0 |
| Sulfur | 2.0 |
| Sym.-di-beta - naphthyl - para - phenylene-diamine | 1.0 |
| Zinc diethyl-dithiocarbamate | 1.0 |
| Zinc sale of 2-mercaptobenzothiazole | 1.0 |
| Sodium salts of polymerized alkylaryl sulfonic acid | 0.24 |
| Casein | 0.12 |
| Caustic soda | 0.10 |
| Water (7.6) | --- |
| 60% carbon black dispersion (7.8) | 0.25 |

These dispersions may be agitated and impregnated with nitrous oxide under a pressure of 75 pounds per square inch.

Before depositing and expanding the foam there may be mixed with it, 12 parts by weight of 25% sodium silico fluoride solution.

In two tanks 15 and 17 a neoprene rubber dispersion may be compounded as follows:

100.0 dry parts, neoprene latex (in aqueous dispersion).
1.0 dry part, 20% ammonia oleate emulsion.
5.0 dry parts, 50% mineral oil emulsion.
2.0 dry parts, 73% sulfur dispersion.
2.8 dry parts, 55% di-beta-naphthyl-para-phenylene diamine dispersion.
2.0 dry parts, 55% sodium butyl dithio carbamate dispersion.
1.0 dry part, 20% catechol.

The following compounds may be added prior to the foaming process:

10 parts, 25% sodium silico fluoride.
15 parts, 130 vol. hydrogen peroxide solution.
6 parts, baking yeast.
5 parts, zinc oxide dispersion.

The above quantity of sodium silico fluoride is adapted to give both types of foam a gelling time of approximately 6 minutes.

The 50% mineral oil emulsion referred to above is produced by agitating together for 1 to 2 minutes 100 parts by weight of a light mineral oil, 2 parts of petroleum castor oil soap in water the concentration of soap being 35%, and 98 parts of water. The mineral oil utilized is light, 21° to 23° API, with a color of 2 max. ASTM, a viscosity on the Saybolt viscosimeter at 100° F. of 150–160; a flash point of 325° with the Cleveland open cup test; a fire point of 370° F., and an aniline point of 154–160 d-611-43T ASTM; it is a straight hydrocarbon with no additives added.

The yeast referred to is commonly called baking yeast and the general terminology of the organism is *Saccharomyces cerevisiae*. The yeast may have a composition of:

| | Per cent |
|---|---|
| Proteins (crude) | 46. |
| Ash | 7.87 |
| Fat | 1.0 |
| Carbohydrate | 37.13 |
| Crude fiber | 8.0 |
| | 100.0 |

The natural rubber dispersion will be expanded to a foam of a density of .4. The synthetic rubber dispersion will be expanded by the enzyme reaction to a foam having a density of approximately .15.

The foam may be deposited as shown in Figure 2.

The cured product will be an intimately bonded mat cured to a unitary mass of remarkably uniform resiliency.

*Example II*

A dispersion compounded as per Example I for the creamed latex was divided into three portions. Nitrous oxide was incorporated into the portions under pressures of 25, 75 and 50 pounds per square inch, respectively.

The portion having nitrous oxide incorporated under 25 pounds pressure was deposited as the first layer. The portions having nitrous oxide incorporated under 75 and 50 pounds pressures were superimposed thereon.

The deposited foams were vulcanized under infra red lamps at a temperature of approximately 240° F.

This particular product when used as seating material has a relatively dense sponge rubber base of high strength in contact with the seat base. The upper layers were soft and yielding, making a pliable seat.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. In a continuous process for making laminated sponge rubber, the steps of incorporating into separate dispersions of a rubber latex varying amounts of gaseous foaming constituents, foaming the separate dispersions, depositing layers of the separate foamed dispersions in superimposed positions prior to gelling thereof, simultaneously gelling the superposed layers, and curing the gelled layers into a unitary sponge product.

2. In a continuous process for making laminated sponge rubber, the steps of incorporating into a rubber latex varying amounts of gaseous foaming constituents, foaming the separate dispersions, depositing layers of the separate foamed dispersions in sequence and in superimposed positions prior to gelling thereof, simultaneously gelling the superposed layers, and curing the gelled layers to a unitary sponge product.

3. In a continuous process for making laminated sponge rubber, the steps of incorporating into a rubber latex varying amounts of gaseous foaming constituents, foaming the separate dispersions, depositing layers of the separate foamed dispersions in sequence and in superimposed positions prior to gelling thereof, simultaneously gelling the superposed layers to gelled foams of differing densities in the range of .1 to .9, and curing the gelled layers to a unitary sponge product.

4. In a continuous process for making laminated sponge rubber, the steps of incorporating into separate dispersions of a rubber latex varying amounts of gas under pressure to foam the said dispersions depositing layers of the foamed separate dispersions in sequence and in superimposed positions prior to gelling thereof, simultaneously gelling the superposed layers, and curing the gelled layers to a unitary sponge product.

5. In a continuous process for making laminated sponge rubber, the steps of incorporating into separate dispersions of a rubber latex varying amounts of nitrous oxide under pressure to foam the said dispersions, depositing layers of the separate foamed dispersions in sequence and in superimposed positions prior to gelling thereof, simultaneously gelling the superposed layers, and curing the gelled layers to a unitary sponge product.

6. In a continuous process for making laminated sponge rubber, the steps of incorporating into separate dispersions of a rubber latex varying amounts of the oxygen producing reagents hydrogen peroxide and yeast to foam the said dispersions, depositing layers of the separate foamed dispersions in sequence and in superimposed positions prior to gelling thereof, simultaneously gelling the superposed layers, and curing the gelled layers to a unitary sponge product.

7. In a continuous process for making laminated sponge rubber, the steps of incorporating into a rubber latex varying amounts of foaming constituents, adding to the dispersions a delayed action gelling agent, foaming the said dispersions, depositing layers of the separate foamed dispersions in superimposed positions prior to gelling thereof, simultaneously gelling the superposed layers, and curing the gelled layers into a unitary sponge product.

8. In a continuous process for making laminated sponge rubber, the steps of incorporating into a rubber latex varying amounts of foaming constituents, adding to the dispersions sodium silico fluoride, foaming the said dispersions, depositing layers of the separate foamed dispersions in superimposed positions prior to gelling thereof, simultaneously gelling the superposed layers, and curing the gelled layers into a unitary sponge product.

9. In a continuous process for making laminated sponge rubber, the steps of incorporating into a rubber latex varying amounts of foaming constituents, adding to the dispersions polyvinyl methyl ether, foaming the separate dispersions, depositing layers of the separate foamed dispersions in superimposed positions prior to gelling thereof, simultaneously gelling the superposed layers, and curing the gelled layers into a unitary sponge product.

HARRY A. TOULMIN, Jr.

REFERENCES CITED

The following references are of record in the file of this patent:

UNITED STATES PATENTS

| Number | Name | Date |
|---|---|---|
| 1,908,747 | Girg | May 16, 1933 |
| 2,032,923 | Eldridge | Mar. 3, 1936 |
| 2,158,033 | McKinney | May 9, 1939 |
| 2,158,083 | Peel | May 16, 1939 |
| 2,167,716 | Harkins | Aug. 1, 1939 |
| 2,214,182 | Schelhammer | Sept. 10, 1940 |
| 2,357,513 | Harmon | Sept. 5, 1944 |
| 2,415,028 | Bosomworth | Jan. 28, 1947 |